Jan. 13, 1953   R. S. CRENSHAW, JR   2,625,325
AVERAGE INDICATING APPARATUS
Filed Jan. 27, 1949
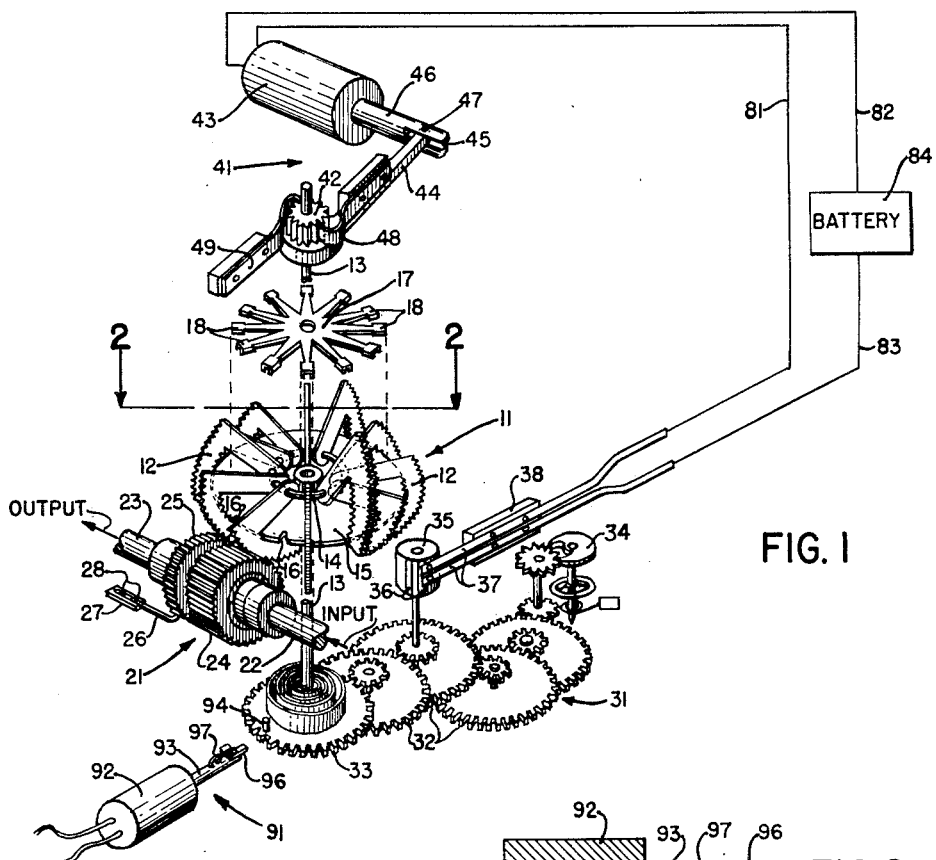
FIG. 1
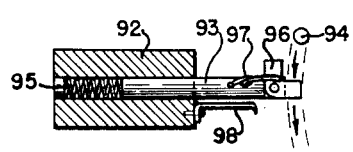
FIG. 6
FIG. 5
FIG. 4
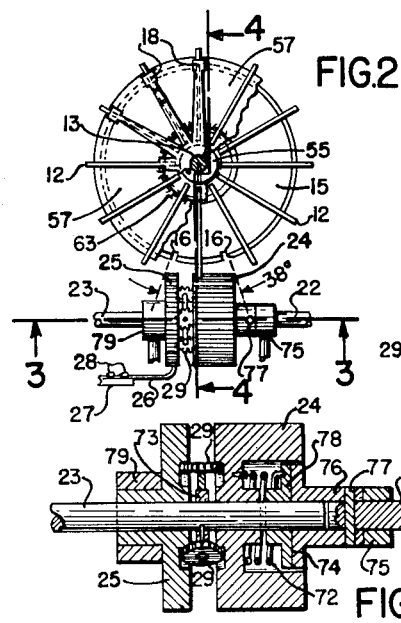
FIG. 2
FIG. 3
INVENTOR.
RUSSELL SYDNOR CRENSHAW, JR.
By  M. A. Hayes
ATTORNEY Patented Jan. 13, 1953

2,625,325

UNITED STATES PATENT OFFICE 2,625,325

AVERAGE INDICATING APPARATUS

Russell S. Crenshaw, Jr., Arlington, Mass.

Application January 27, 1949, Serial No. 73,209

9 Claims. (Cl. 235—61)

(Granted under Title 35, U. S. Code (1952), sec. 266)

This invention relates to an indicator for showing the running average of a varying rate of occurrence, such as the number of times an event has occurred in the immediately preceding unit of time. The indications may be read in terms of the number of shots a gun has fired in the immediately preceding minute, or the number of miles a vehicle has traveled in the past hour. The indications thus give a measure of what is commonly spoken of as what the gun or vehicle "averaged" for the "last" period of time or the "running average" being made. In addition to the examples cited above, the indications may be used to read the production rate or piece rate of machines, fuel consumption rate, traffic rate, or customers per hour or where the rate of occurrence is desired over a period of time which may be less than the total elapsed time.

Applied to transportation, the indicator will give readings in "miles per hour," but it is not to be confused with the ordinary speedometer which indicates instantaneous rate of travel, nor with the usual average speed indicator which provides methods for dividing the total distance traveled by the total elapsed time. The normal averaging system has the disadvantage that the total elapsed time average may be of less value in following a schedule than the knowledge of a running average rate of progress which is related to the same time base as the instantaneous rate.

Various forms of measuring devices are operable to produce or transmit an impulse which corresponds to a predetermined unit quantity being measured. This invention provides a device to store up the sum of units measured over a predetermined increment of time and to indicate the total number of units stored in the preceding specific number of increments. Applied to a vehicle, for example, the device may be said to have a memory to remember the miles which have been covered during the last hour. If at equal periods of time the number of miles traveled in that period of time is put into the memory, and at the same time the number of miles is taken out which was put in one hour ago, there will always remain in the memory exactly the number of miles traveled during the hour preceding the moment of the last change. Hence, the running average miles per hour is displayed.

The principal object of the invention is to provide method and apparatus for providing an indicator which is advanced by an independently movable actuating device proportionately to the measurement of the number of events occurring during a measuring period, a storage device for holding the measurement for the number of measuring periods in the base time interval, and at the end of the base time interval an independently movable actuating device for subtractive movement of the indicator proportional to the measurement taken at the beginning of the base time interval.

Another object of the invention is to provide an indicator mechanism which shall automatically reset itself to a reading of zero providing it remains unused for a time interval beyond the base period of measurement.

While the device which is about to be described, represents a preferred embodiment of my invention, it is to be understood that this is not the only way in which the invention may be practiced and that the details of the construction herein shown and described are for the purpose of illustration only and are not intended to limit the scope of my invention as defined by the claims.

In the drawings:

Fig. 1 is a perspective drawing (partly exploded) illustrating the assembly of the invention;

Fig. 2 is a plan drawing of the differential and register of the invention as viewed from line 2—2 of Fig. 1;

Fig. 3 is a section of the differential taken along line 3—3 of Fig. 2;

Fig. 4 is a section of the register and differential taken generally along line 4—4 of Fig. 2;

Fig. 5 is a detail drawing in section of the solenoid and plunger stop in its initial stopping position;

Fig. 6 is a detail drawing in section of the solenoid and plunger stop in its final stopping position.

Referring to Fig. 1 the invention is seen to be comprised of a storage register 11 in which measurements are periodically stored for a predetermined time interval, a differential mechanism 21 responsive to measurements entering and leaving storage to display the quantity of measurements in storage, a timer 31 for controlling the periods of measurement and storage, and a drive mechanism for intermittently moving the register 11 in steps at timed intervals alternately to unlock the register to discharge and receive measurements and then to lock the register for the next period of measurement.

The register section 11 has twelve gear sectors 12 which are mounted radially about driveshaft 13, 30° apart in the horizontal plane. Each gear sector is mounted to pivot about a ring 14 concentric with driveshaft 13. Referring to Fig. 4 for details of the mounting of the gear sectors 12, each gear sector is shown as having a radial arm 51 and an arcuate section 52 having gear teeth 53 cut in its outer edge. The inner edge of the arcuate section 52 has ratchet teeth 54. The radial arm 51 is pivoted about ring 14. Hub 55 is mounted concentric with shaft 13 and fastened rigidly to shaft 13 by means of lock screw 56. A guide plate 57 is shown supported from hub 55 by screws 58 to prevent gear sections 12 from twisting from their radial position. Hub 55 has a groove 62 cut in its periphery as a support for ring 14, plate 57 has ears 63 punched at intervals and spaced radially from driveshaft 13 to serve as retaining fingers to hold ring 14 in the groove 62 in hub 55. Plate 15 is shown mounted concentric with but not touching shaft 13 on column 59 which is fastened securely to the instrument case 59 by bolts 61.

Referring to Fig. 2, plate 15 has a beveled edge in which two notches 16 are cut 30 degrees apart, 15° either side of line 4—4. Referring again to Fig. 1, the edge of plate 15 engages the ratchet teeth 54 on the inside edge of the arcuate arm 52 of gear sector 12, except when a sector is in line with one of the notches 16, so that the gear sectors 12 are restrained from vertical rotation about pivot ring 14. Plate 15 also serves as a reference point or "zero stop" for the gear sectors. Leaf spring spider 17 is mounted concentric with shaft 13 on hub 55 by means of screws 58. Spider 17 is provided with leaf spring arms 18, one for each of the gear sectors 12 which exerts a biasing force acting downwardly on the top of each gear sector. When the gear sectors 12 are successively in line with the left hand (Fig. 2) notch 16 of plate 15, the sectors are moved down under the biasing force of spring arm 18 until the lower edge of the radial arm 51 rests against the upper surface of plate 15.

The differential section 21 engages each gear sector 12 as it comes opposite. The centerline of the differential gearing, input shaft 22, and output shaft 23 is in the same horizontal plane as the horizontal pivot ring 14 of the gear sectors 12.

The input shaft 22 is adapted to be rotated in response to the occurrence of the events being measured. The output shaft 23 is intended to be connected to an indicator (not shown). It could be used to actuate a pointer in cooperation with a dial carrying suitable indicia, or to actuate counting mechanism like the well-known Veeder-Root counter.

The input gear 24 of the differential is adapted to engage the gear sectors while they are in position as shown in Fig. 2. Thus, while a gear sector 12 is in position shown, it is being held in its reference position by the engagement of plate 15 with ratchet teeth 54 and the input gear 24 is restrained from turning. When a gear sector 12 is in line with the right hand notch 16 (Fig. 2) of plate 15, input gear 24 can drive the sector 12. Since the input shaft 22 may be rotating constantly and the input gear 24 can move only intermittently, a torsion spring 72 and friction drive indicated generally as 74 is interposed between gear 24 and shaft 22 as shown in Fig. 3. Input shaft 22 passes through bearing 75, fastened rigidly to the instrument case (not shown in Fig. 3) and terminates in a plate 76, fastened rigidly to shaft 22 by pin 77. Mounted coaxially with input shaft 22 and output shaft 23 and pivoted thereon to turn freely is plate 78 urged against plate 76 by torsion spring 72 to provide a friction drive adjusted to slip when the input gear is about 15 teeth behind the input shaft 22 and adapted to prevent injury to the mechanism in case the shafting is driven when the mechanism is not operating. Thus the input shaft 22 can load the torsion spring 72 while the input gear 24 is restrained. Stops (not shown in the drawings) are provided on the hub of gear 24 and the hub of plate 78 so that there is a positive point of alignment of gear 24 with input shaft 22 when gear sector 12 is driven to its position of measurement.

The output gear 25 is mounted coaxially with output shaft 23 and is pivoted thereon to turn freely. Output shaft 23 and gear 25 are supported by bearing 79 fastened rigidly to the instrument case (not shown in Fig. 3). Output gear 25 engages gear sectors 12 only when they are in line with the left hand notch 16 (Fig. 2) of plate 15, in which position the gear sectors 12 are restored to "zero" position by the biasing force of the spring arm 18, thereby transferring the previously stored measurement to a rotation of the output gear 25. When the output gear 25 is not being driven or being held by a gear section, it is restrained from rotation by spring finger 26 which keeps gear 25 lined up to mesh with the teeth 53 of the next gear sector 12 to arrive in meshing position. Spring finger 26 is mounted to the instrument case (not shown) by supporting block 27 to which it is fastened by pins 28. Fastened to arms 73 rigidly mounted 120° apart on shaft 23 (as shown in Fig. 4) are sun gears 29 which mesh with gear teeth (not shown) cut in the faces of gears 24 and 25. Thus the output shaft 23 of differential 21 is seen to be rotated an amount equal to one-half the rotation of the input gear 24 minus one-half the rotation of the output gear 25.

The timing section 31 as shown in Fig. 1 is essentially a spring driven clockwork which is wound by rotation of the main drive shaft 13. Through a suitable gear train, indicated generally as 32, the rotation of the main spring gear 33 is controlled by the regulation action of a conventional escapement 34. At a suitable point in the gear train 32, the drive for commutator 35 is obtained to rotate commutator 35 twelve times for every revolution of gear 33. The gear train and escapement are adjusted, in the present embodiment, so that main gear 33 rotates once in $^{12}/_{11}$ of an hour. Commutator 35 has two conducting strips 36 mounted axially on the insulating surface of commutator 35. The two conducting strips 36 are mounted as close together as practicable so that one will make contact a few seconds after contact with the other has opened. Spring contact fingers 37 are mounted on block 38 supported from the instrument case (not shown in Fig. 1). In the embodiment as shown, the timing section 31 acts to close the contact between the two fingers 37, to open it almost immediately, to close it again after a short interval of about 30 seconds, to open it again almost immediately, and to repeat the cycle after $^{1}/_{11}$ of an hour or 5.45 minutes.

The stepping section 41 is a simple solenoid actuated ratchet and pawl drive. There are 24 teeth on the ratchet gear 42 fastened rigidly to shaft 13 by a pin (not shown) and the solenoid 43 drive acts to rotate shaft 13 counterclockwise $^{1}/_{24}$ of a turn of 15° per stroke. The driving crank 44 is connected to a slot 45 in the solenoid plunger 46 by a pivot 47, and crank 44 is free to turn on main shaft 13. The driving torque is transmitted through ratchet spring pawl 48 mounted on crank 44. A similar ratchet spring pawl 49 is mounted to the instrument casing (not shown) on the opposite side of gear 42 to prevent clockwise rotation of shaft 13 and to hold the spring tension on the main spring gear 33 of the timing section 31.

The solenoid winding of solenoid 43 is connected by leads 81, 82, and 83 through a source of electrical energy, illustrated as battery 84, to contact fingers 37 of timing section 31. When contact fingers 37 make a closed circuit with one of the conducting strips 36 on commutator 35, solenoid 43 is energized and core 46 is moved inwardly to move shaft 13 one step of 15° rotation. When the solenoid is not energized, contact at commutator 35 being open, the plunger is pushed outwardly to its initial position by a spring (not shown) mounted internally similar to the construction shown in the solenoid section of Figs. 5 and 6.

When the register 11, differential 21, timer 31 and drive mechanism 41 are assembled, one arrangement is the locked position shown in Fig. 2 of the drawing in which all twelve gear sectors 12 are restrained from motion by engagement with plate 15, one of them also meshing with differential input gear 24 which thereby locks differential 21. Since input gear 24 is locked against motion and shaft 22 may move in response to the measurement being made, a torsion spring 72 and a friction drive 74, shown in Fig. 3, are interposed between gear 24 and input shaft 22. Thus the input shaft 22 can load the torsion spring 72 in accordance with measurements occurring in the time interval while the input gear is restrained.

After the timed interval of measurement is completed, the drive mechanism is actuated to move the register section counterclockwise 15°. Ten of the twelve gear sectors 12 remain locked by plate 15; one gear sector is brought into alignment with the slot 16 in plate 15 to the left of line 4—4 and into engagement with differential gear 25 whereupon spring arm 18 causes the gear sector to be driven to its reference position; the twelfth gear sector, which had been locking differential gear 24, is brought into alignment with the slot 16 in plate 15 to the right of line 4—4 and remaining in engagement with gear 24 is driven by torsion spring 72 to a position corresponding to the rotation imparted to shaft 22 during the immediately preceding period of measurement. Thus the differential gear 25 is driven by spring 18 and the differential gear 24 is driven by spring 72 simultaneously by amounts corresponding to measurements leaving and entering storage so that the position of output shaft 23 is reset by the difference of the respective measurements.

After the transfer of measurements into and out of the storage register, the drive mechanism is actuated to move the storage register counterclockwise 15°. Eleven of the twelve gear sectors are again locked in positions of measurement by plate 15. The twelfth gear sector is at "zero" or its reference position, having just discharged its previous measurement, is meshed with differential gear 24 and plate 15 to lock the differential and is ready to accept the value measured during the next time interval.

Thus the apparatus is driven by the stepping mechanism through alternate positions of measurement and positions of transfer of measurements into and out of the storage register. In order for the total time between a measurement entering storage and the same measurement leaving storage to be one hour, the time interval between the start of measurements is 60/11 or 5.45 minutes. The timed interval during which all gear sectors are locked is substantially 5 minutes, leaving somewhat less than 30 seconds for the period of transfer of measurements. The output shaft 23 is seen to be locked against motion for intervals of 5 minutes spaced by intervals of less than thirty seconds during which time it is reset in accordance with the difference of measurements entering and leaving storage. The cycle then repeats. Assuming one tooth being equivalent to a mile when the mechanism is used on a vehicle, the gear sector in engagement with input gear 24 is moved by the number of teeth corresponding to the number of miles traveled while the differential was locked and the indicator is also moved correspondingly. Simultaneously the number of miles set up one hour previously is removed from the indicator by the restoration to zero position of the gear sector in engagement with output gear 25. Thus, the output shaft 23 has a rotational position indicative of the number of miles being stored in the register section 11.

In the embodiment disclosed, say for automotive use, the main gears of the differential 21 must engage the gear sectors 12 over an arc of about 35° of rotation of the drive shaft 13. The cosine of half the angle (35°/2), is 0.95, which means that the gear teeth 53 of the gear sectors 12 must be about $1/20$ the radius of the register section or about $1/12$ the radius of a gear sector radial arm 51 to permit the use of cylindrical gears in differential 21. Although this restriction impresses a limitation on the number of teeth allowable on a gear sector, at least 12 teeth in 90° can be used. Since accuracy to the nearest mile is taken as being satisfactory for automotive use, one tooth can be made to correspond to one mile. Thus each sector could store a maximum of 12 miles taken from the 5.45 minute time interval between readings, or the mechanism could handle a maximum of 132 miles per hour. If the differential gears are selected with 33 teeth (132/4), the two to one stepdown gearing of the differential will provide 132 miles per revolution of the output shaft 23. This gearing would be satisfactory for a simple dial and pointer indicator. Additional satisfactory dimensions for such an instrument would make the radius of the differential gears about 0.7 the radius of the gear sectors and the dimensions might be chosen as:

| | Inches |
|---|---|
| Differential main gear diameter | 1.0 |
| Gear sector radius | 0.72 |
| Main diameter register section | 2.0 |

In considering the strength of the springs, the leaf springs 18 must be strong enough and have sufficient initial loading when the gear sectors are depressed to the "zero" position to overcome the friction of the output shaft and the indicator. The torsion spring 72 must have sufficient initial loading to overcome the bias of leaf spring arms 18 when they are at maximum deflection. The strength of the solenoid springs will depend on standard manufacturing procedures.

The solenoid mechanism, generally indicated as 91, is a solenoid 92 whose electrical winding is placed in the ignition circuit of the vehicle, or control circuit of the system for which the indicator is to be used. In automotive use it is desirable to shut the mechanism off after the vehicle has stopped, but not before at least one hour has elapsed, because the instrument cannot correctly take into account periods when the ignition is off. The solenoid 92 holds the plunger 93 inwardly of the stop pin 94 on main spring gear 33 while the current is flowing in the solenoid winding. When the ignition is turned off, spring 95 inside the solenoid case, extends the plunger 93 outwardly until the bell crank stop 96 on the outward end of the plunger 93 can engage pin 94. The first time pin 94 strikes bell crank 96, the crank 96 rotates 90°. The second time pin 94 strikes crank 96, crank 96 can rotate no further, so it holds pin 94 and prevents further rotation of the timing section 31 thereby stopping the entire mechanism. The instrument is thus shut off within one to two revolutions of the main spring gear 33 after the ignition is shut off. The pin 94 must be positioned circumferentially on main spring gear 33 so that contact strips 36 do not close the circuit of contact fingers 37 when the mechanism is stopped. When the ignition is again turned on, the plunger 93 is pulled inwardly into the solenoid against the bias of spring 95 and the bell crank stop 96 is restored to its original position by the action of cam 98 fastened to the solenoid structure. Bell crank stop 96 is held in either of its 90° positions by the action of overriding spring 97.

In the automotive embodiment discussed herein, the energizing supply for the solenoids would be a 6-volt storage battery 84 of the vehicle. Solenoid 43 would be pulsed only 22 times an hour while the engine and generator were running, and when operated on battery alone (ignition off) it would be pulsed a maximum of 47 times. Solenoid 92 could be made very small and requires energy only when the vehicle is running. Therefore, the electrical load on the vehicle's power system is seen to be quite light.

It is to be understood that my invention is not to be limited to the foregoing specific description or to the type of devices illustrated in the accompanying drawings. Various modifications may be made in the several mechanisms employed and the duration of operations may be regulated to suit conditions within the principle and scope of the invention as expressed in the appended claims.

The invention described herein may be manufactured and used by or for the Government of the United States of America for government purposes without the payment of any royalty thereon or therefor.

What it is claimed is:

1. Apparatus for indicating the running average of the rate of occurrence of events comprising a driven shaft, a source of electrical energy, a timing mechanism, a switch adapted to be operated at selected predetermined intervals of time from said timing mechanism, a pawl and ratchet lever drive to rotate said shaft in angular steps, a magnetic solenoid and core adapted to operate said lever, conducting leads to connect said solenoid to said source through said switch, a plurality of gear sectors disposed radially about the axis of said shaft and pivoted from a supporting structure rigidly fastened coaxially to said shaft to move said gear sectors through steps of angular rotation with said shaft, an input shaft adapted to rotate proportionally to the occurrence of events, an output shaft, a differential gearing having input and output gears, said differential being interposed between said input shaft and said output shaft and adapted to mesh with said gear sectors successively, a resilient connection between said differential and said input shaft, a spring member to bias each of said gear sectors toward a reference position, ratchet and pawl means to lock said gear sectors in position, means operated during the stepping rotation of said driven shaft to move said gear sectors into mesh successively with said gear and periodically to unlock the gear sector meshed with said input gear and the gear sector meshed with said output gear whereby said output shaft is simultaneously rotated by the action of said input shaft to position said gear sector meshed with said input gear and by the action of said spring to restore to said reference position said gear sector meshed with said output gear, and means operated by the stepping action of said driven shaft to disengage said gear sectors and said differential gearing and to relock said mechanism.

2. Apparatus as in claim 1 in which said timing mechanism includes means actuated to stop said timing mechanism when measurements are interrupted.

3. Indicating apparatus for displaying a running average comprising, a member adapted to be positioned proportionately to the value of the measured quantity during timed measurement periods, a storage mechanism periodically responsive to the position of said member to register said measurement, means to lock said measurement in said storage mechanism for a predetermined time interval, means to restore said storage mechanism to its initial position to discharge said measurement after said time interval, an indicating mechanism periodically actuated simultaneously by said registration and said restoration, and a timing mechanism to regulate the period of measurement and the interval of storage.

4. Indicating apparatus for displaying a running average comprising, an indicating mechanism, a member positioned in proportion to the value of the measured quantity during selected increments of time, a storage mechanism intermittently responsive during timed registration periods to the position of said member to register the measure of said quantity obtained in said selected increment of time, means to lock said measurement over the time interval of a predetermined specific number of said increments, means to remove the stored measurement after said predetermined time interval, a time controlled drive mechanism to regulate said intervals of time for the intermittent motion of said storage mechanism alternately to positions of measurement registration and positions of storage, and means responsive simultaneously to said registration and said removal of measurements for actuating said indicating mechanism.

5. Indicating apparatus for displaying a running average comprising, an indicating mechanism, a member positioned in proportion to the value of the measured quantity, a storage register mechanism intermittently responsive to the position of said member to register the measure of said quantity obtained during a selected increment of time, means to lock said register measurement in storage over a predetermined specific number of said increments, means to remove the stored measurement from said storage register after said predetermined time interval, a time mechanism to regulate said intervals of time, a time controlled drive mechanism for the intermittent motion of said storage mechanism alternately to positions of measurement registration and positions of measurement storage, and a differential gearing mechanism responsive simultaneous to said registration and said removal of measurements for actuating said indicating mechanism whereby the running average displayed by said indicating mechanism is periodically reset.

6. An indicator for displaying a running average comprising, a normally locked differential gear mechanism, a shaft whose position is controlled by said mechanism, an input shaft whose movement is to be measured resiliently connected to one of the members of said differential mechanism, a storage register having a plurality of gear sectors adapted to be displaced from an initial position proportionally to the movement of said input shaft and a rotary support carrying said gear sectors and intermittently movable to bring each gear sector in succession into and out of meshing engagement with said member and after a predetermined interval of time into and out of meshing engagement with another member of said differential gear mechanism, a locking device to prevent rotation of said gear sectors between positions of meshing engagement with said differential gear members, means biasing said gear sectors toward said initial position, and a time controlled drive mechanism for regulating the intermittent motion of said storage register gear sectors to said position of engagement and to unlock and relock said differential and said gear sectors, whereby the simultaneous actuation of said register to enter and remove measurements resets periodically the running average displayed by said indicator.

7. An indicator for displaying a running average comprising a normally locked differential gear mechanism, a shaft whose position is controlled by said differential gear, a second shaft whose movement is to be measured resiliently connected to one of the members of said differential gear, a storage register having a plurality of gear sectors adapted to be displaced from an initial position proportionally to the movement of said second shaft and a rotary support carrying said gear sectors and intermittently movable to bring one of said gear sectors into and subsequently out of meshing engagement with said member while a second gear sector is in and out of meshing engagement with another member of said differential gear mechanism, a locking device to prevent rotation of said gear sectors between position of meshing engagement with said differential mechanism, means for restoring said gear sectors to said initial position, and a time controlled drive mechanism for regulating the intermittent motion of said storage register to position alternately to unlock said differential gear mechanism and said gear sectors in said position of engagement with said differential mechanism and to relock said gear sectors and said differential mechanism, whereby the simultaneous actuation of said storage gear sectors while engaged with said differential to enter and remove measurements resets periodically the running average displayed by said indicator.

8. Indicating apparatus for displaying the running average of the rate of occurrence of events comprising, an output shaft, an input shaft rotatable angularly in proportion to the occurrence of said events, a storage mechanism having a plurality of members displaceable from a reference position to a position of measurement, a ratchet mechanism for locking said members in position, a spring for restoring said members to said reference position, a normally locked differential interposed between said input shaft and said output shaft, a resilient connection between said differential and said input shaft, a timing mechanism controlling alternate periods of measurement and periods of storage, a driving mechanism actuated at selected increments of time in response to said timing mechanism alternately to bring successive pairs of said members into meshing engagement with said differential and to unlock said differential and said pair of members during said storage period and subsequently to disengage said members and to relock said differential and said members during said measuring period, whereby said ouput shaft is periodically reset by the displacement of one of said pair of members from its reference position to a position corresponding to the rotation of said input shaft acting through said differential simultaneously with the restoration of the second of said pair to its reference position through said differential during said period of measurement storage while said members and said differential are unlocked.

9. Apparatus for indicating the running average of a variable comprising, a time controlled drive mechanism to provide alternate periods of measurement and measurement storage, an input shaft movable in proportion to the measured value of said variable, an output shaft, a differential gear train interposed between said input shaft and said output shaft and locked by said mechanism during periods of measurement and unlocked during periods of measurement storage, a resilient connection from said input shaft and said differential to permit movement of said shaft while said differential is locked, a storage register having a plurality of elements biased to a reference position and displaceable from said reference position to a position corresponding to a measured value of said variable, said storage register being driven by said mechanism in steps at timed intervals alternately for periods of measurement to positions locking said elements for measurement storage and for periods of measurement storage to positions wherein a pair of said elements are unlocked in meshed engagement with said differential, one of said pair being displaced by said input shaft to receive for storage the measurement made during the immediately preceding measurement period, and the other of said pair being restored to its reference position by said bias to discharge from storage the measurement made previously by the averaging interval, whereby said output shaft is periodically reset in position by the difference of measurements simultaneously received and discharged by said storage register through said differential.

RUSSELL S. CRENSHAW, Jr.

REFERENCES CITED

The following references are of record in the file of this patent:

UNITED STATES PATENTS

| Number | Name | Date |
| --- | --- | --- |
| 1,094,439 | Hatfield | Apr. 28, 1914 |
| 1,178,791 | Fitzpatrick | Apr. 11, 1916 |
| 2,189,107 | Gould | Feb. 6, 1940 |

FOREIGN PATENTS

| Number | Country | Date |
| --- | --- | --- |
| 391,313 | France | Oct. 28, 1908 |
| 480,135 | Great Britain | Feb. 17, 1938 |